United States Patent [19]

Kun et al.

[11] Patent Number: 4,951,064

[45] Date of Patent: Aug. 21, 1990

[54] THIN FILM ELECTROLUMINESCENT EDGE EMITTER ASSEMBLY AND INTEGRAL PACKAGING

[75] Inventors: Zoltan K. Kun, Churchill; David Leksell, Oakmont; Norman J. Phillips, Pittsburgh, all of Pa.

[73] Assignee: Westinghouse Electric Corp., Pittsburgh, Pa.

[21] Appl. No.: 351,495

[22] Filed: May 15, 1989

[51] Int. Cl.[5] .......................... G01D 15/14; G01D 9/42

[52] U.S. Cl. .................................. 346/107 R; 346/160; 346/155

[58] Field of Search .................... 346/107 R, 108, 160, 346/155, 76 PH; 358/302, 300, 296; 355/1, 67, 69, 70; 357/17, 30, 72, 73, 74, 75, 76, 82; 362/800, 84, 31; 313/500; 372/45

[56] References Cited

U.S. PATENT DOCUMENTS

| | | | |
|---|---|---|---|
| 4,478,504 | 10/1984 | Tanaka | 355/69 |
| 4,535,341 | 8/1985 | Kun | 346/107 R |
| 4,549,784 | 10/1985 | Inokuchi | 355/1 |
| 4,633,271 | 12/1986 | Segawa | 346/107 R |
| 4,660,052 | 4/1987 | Kaiya | 346/76 PH |
| 4,703,334 | 10/1987 | Mochimaru | 346/160 |
| 4,724,490 | 2/1988 | Tanioka | 346/160 |
| 4,734,714 | 3/1988 | Takasu | 346/107 R |
| 4,734,723 | 3/1988 | Ishitobi | 346/160 |
| 4,807,047 | 2/1989 | Sato | 358/300 |
| 4,820,013 | 4/1989 | Fuse | 357/30 |
| 4,821,051 | 4/1989 | Hediger | 346/160 |
| 4,827,290 | 5/1989 | Yoritomo | 346/160 |
| 4,829,321 | 5/1989 | Iizuka | 346/107 R |

*Primary Examiner*—Bruce A. Reynolds
*Assistant Examiner*—Scott A. Rogers
*Attorney, Agent, or Firm*—J. K. Williamson

[57] ABSTRACT

A thin film electroluminescent edge emitter assembly includes an edge emitter structure disposed on a layer of substrate material. The structure has a configuration to define a linear array of spaced-apart, light-emitting pixels. A packaging assembly surrounds at least a portion of the edge emitter structure to enclose the linear array of light-emitting pixels in a contaminant-free environment. At least the wall of the packaging assembly adjacent to the array of pixels is made from a translucent material to permit light energy emitted by selected pixels of the array interior to the packaging assembly to pass through the wall of the packaging assembly.

21 Claims, 5 Drawing Sheets

THIN FILM ELECTROLUMINESCENT EDGE EMITTER ASSEMBLY AND INTEGRAL PACKAGING

BACKGROUND OF THE INVENTION

1. Field of the Invention

This invention relates generally to an electronically controlled, high resolution light source, and more particularly, to a high resolution light source formed from a thin film electroluminescent edge emitter assembly sealed within a protective package.

2. Background Information

It is well known that an electroluminescent device generally, and particularly a thin film electroluminescent edge emitting device, may be utilized to provide an electronically controlled, high resolution light source. One such type of application is disclosed in U.S. Pat. No. 4,535,341 to Kun et al. which is assigned to the assignee of the present invention. This patent discloses a thin film electroluminescent line array emitter structure which includes a first dielectric layer disposed on a common electrode, a second dielectric layer spaced from the first dielectric layer, a phosphor layer interposed between the first and second dielectric layers and an excitation or top electrode disposed on the second dielectric layer. At least one of the electrodes, for example, the excitation or top electrode, is segmented to form a plurality of individual control electrodes. The plurality of individual control electrodes in combination with the remaining structure define a plurality of individual light-emitting pixels.

Another example of a device which utilizes an electroluminescent light-emitting unit as a light source is illustrated in U.S. Pat. No. 4,734,723. This patent discloses an electrophotographic printer which includes an optical head formed from a plurality of electroluminescent devices positioned along one edge of a substrate. A plurality of light waveguide strips are also formed on the substrate in association with the electroluminescent devices, and the waveguide strips serve to transmit the light from the electroluminescent devices to the other edge of the substrate which is brought into a face-to-face relationship with the printer photoreceptor.

Japanese Laid-Open Patent Application KoKi No. 63-91998 discloses an EL luminescent edge emitter array in which the upper side metallic electrode wraps around the reflecting end surface of the luminescent layer. Each of the EL elements in the array is surrounded by an insulating film whose refractive index is lower than that of the EL layer. The array further includes a discharge prevention area between the bottom electrode and the reflecting end of the top metallic electrode.

Although the prior art disclose thin film electroluminescent edge emitter devices of various form, none of these structures includes an integral housing or packaging assembly operable to protect the device itself from damage due to moisture or other harmful contaminants. It is apparent that if an edge emitter is to be used commercially as a high resolution light source, then the edge emitter itself must be isolated from these contaminants in order to provide extended, maintenance-free service.

Therefore, there is a need for a thin film electroluminescent edge emitter assembly sealed within an integral housing or packaging assembly. The packaging assembly is operable to provide a contaminant-free environment for the edge emitter. At least one wall of the packaging assembly is formed from a translucent material to permit the light energy emitted by the edge emitter to pass through the translucent wall to the exterior of the packaging assembly. In addition, the packaging assembly itself should be of compact design to permit the edge emitter which it houses to be advantageously used as a high resolution light source in devices such as electrophotographic-type imaging stations or printers.

SUMMARY OF THE INVENTION

In accordance with the present invention, there is provided a thin film electroluminescent edge emitter assembly and integral packaging which includes a thin film electroluminescent edge emitter structure disposed on a layer of substrate material. The structure has a configuration to define a linear array of spaced-apart or isolated light-emitting pixels. Each pixel includes a first surface disposed on the layer of substrate material, a second surface spaced from the first surface, and a light-emitting edge surface extending between the first and second surfaces. A packaging assembly surrounds at least a portion of the edge emitter structure to enclose the linear array of light-emitting pixels in a contaminant-free environment. At least a portion of the packaging assembly including a wall adjacent to the light-emitting edge surfaces of the pixels of the array is made from a preselected translucent material to permit light energy emitted by selected ones of the pixels interior to the packaging assembly to pass through the wall of the packaging assembly.

Further in accordance with the present invention, there is provided an electrophotographic-type imaging station which includes a photoreceptor and a charging device positioned adjacent to the photoreceptor for charging the same. A developing device is positioned adjacent to the photoreceptor for forming a toner density pattern on a charged area of the photoreceptor. A transfer device is also positioned adjacent to the photoreceptor for transferring a toner image from the photoreceptor to a sheet of paper.

A thin film electroluminescent edge emitter assembly is positioned adjacent to the photoreceptor, the edge emitter assembly including a thin film electroluminescent edge emitter structure disposed on a layer of substrate material. The structure itself has a configuration to define a linear array of spaced-apart or isolated light-emitting pixels. Each pixel includes a first surface disposed on the layer of substrate material, a second surface spaced from the first surface, and a light-emitting edge surface extending between the first and second surfaces. A packaging assembly surrounds at least a portion of the edge emitter structure to enclose the linear array of light-emitting pixels in a contaminant-free environment. At least a portion of the packaging assembly including a wall adjacent to the light-emitting edge surfaces of the pixels of the array is made from a preselected translucent material to permit light energy emitted by selected ones of the pixels interior to the packaging assembly to pass through the wall of the packaging assembly and onto striking contact with the surface of the photoreceptor.

Still further in accordance with the present invention, there is provided a thin film electroluminescent, composite light source which includes first and second thin film electroluminescent edge emitter assemblies. The first and second edge emitter assemblies each include a thin film electroluminescent edge emitter structure disposed on a layer of substrate material. Each structure has a configuration to define a linear array of spaced-apart or isolated light-emitting pixels. Each pixel of each of the structures includes a first surface disposed on the associated layer of substrate material, a second surface spaced from the first surface and a light-emitting edge surface extending between the first and second surfaces. The first and second edge emitter assemblies are oriented relative to each other so that the second edge emitter assembly is inverted relative to the first assembly with the light-emitting edge surfaces of the pixels of the inverted second assembly lying in substantially the same plane as the light-emitting edge surfaces of the pixels of the first assembly. Adjacent end portions of the first assembly and second inverted assembly overlap to provide a composite array of light-emitting pixels of desired overall length. The composite array of light-emitting pixels is sealed within a packaging assembly to isolate the array from harmful contaminants.

BRIEF DESCRIPTION OF THE DRAWINGS

The above, as well as other features of the present invention, will become apparent through consideration of the detailed description in connection with the accompanying drawings in which.

DESCRIPTION OF THE PREFERRED EMBODIMENTS

Figure 1:
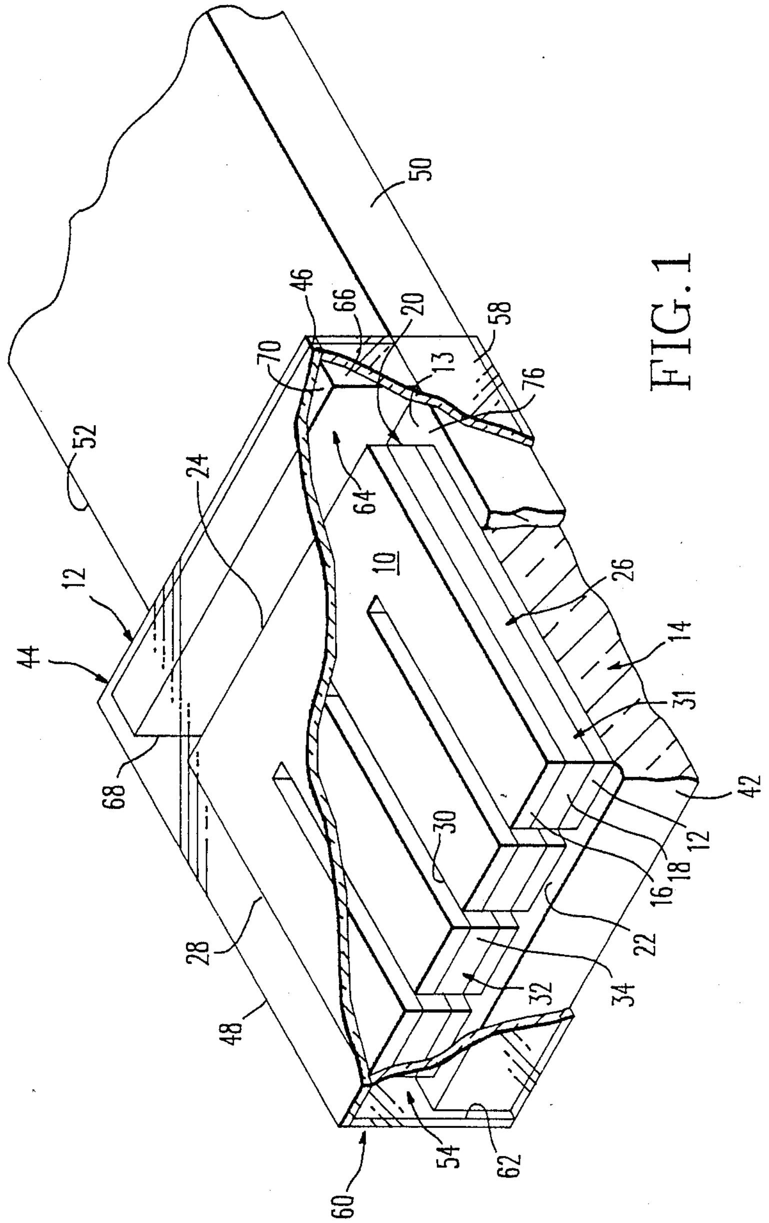
FIG. 1 is a partial sectional, perspective view of a thin film electroluminescent edge emitter assembly forming an array of pixels sealed within the contaminant-free packaging assembly of the present invention.

Referring to the drawings, and particularly to FIG. 1, there is illustrated a partial sectional, perspective view of a portion of a thin film electroluminescent (TFEL) edge emitter assembly generally designated by the numeral 10 for use as a solid state, electronically controlled high resolution light source. Edge emitter assembly 10 is enclosed in a packaging assembly 12. As will be explained herein, packaging assembly 12 isolates TFEL assembly 10 from potentially harmful contaminants such as moisture or other airborne particulates which would otherwise damage the various material layers forming the assembly. Isolating the TFEL edge emitter assembly from the invasion of potentially damaging contaminants allows the edge emitter assembly to be advantageously utilized as a high resolution light source in rugged environments inherent to devices such as electrophotographic-type imaging stations and printers.

The construction and operation of thin film electroluminescent (TFEL) edge emitter assembly 10 illustrated in FIG. 1 are known in the art, and will not be described in detail herein. Generally, however, TFEL edge emitter assembly 10 includes a first layer of electrically conductive material 12 disposed on the upper surface of a layer of substrate material 14, a second layer of electrically conductive material 16 spaced from first electrically conductive layer 12 and an electrically energizable, light-emitting composite layer 18 interposed between the first and second electrically conductive layers 12, 16. The first and second electrically conductive layers 12, 16, and composite layer 18 form, in combination, an edge emitter structure generally designated by the numeral 20. It should be understood that electrically energizable, light-emitting composite layer 18 is illustrated only schematically in FIG. 1, and may actually be formed, for example, from a layer of phosphor material and at least one layer of dielectric material. However, it is intended that the invention described herein not be limited to the use of a dielectric layer and a phosphor layer to form the light-emitting, composite layer. It should be further understood that the identifying terms "first" and "second" electrically conductive layers are used herein for the sake of clarity only, and are not intended to represent the positions of these respective layers within the TFEL edge emitter structure.

Edge emitter structure 20 has a front edge portion 22, an opposing rear edge portion 24 and a pair of opposing lateral edge portions 26, 28. A plurality of channels 30 are formed in structure 20 to extend from front edge portion 22 a preselected distance into the structure towards rear edge portion 24. The plurality of channels 30 formed in the structure define a plurality of light-emitting pixels 32. Each pixel 32 has a light-emitting edge surface 34 extending between the portions of the first and second electrically conductive layers 12, 16 associated with the pixel. As known in the art, the application of an electrical signal of sufficient absolute magnitude to the portions of the first and second electrically conductive layers associated with a particular pixel will cause the portion of the electrically energizable, composite layer associated with the pixel to emit light energy at the pixels' light-emitting edge surface. It should be understood that although only four light-emitting pixels 32 are illustrated in FIG. 1, any number of pixels may be formed in structure 20 depending upon the overall length of structure 20 and the actual number of channels formed.

Figure 2:
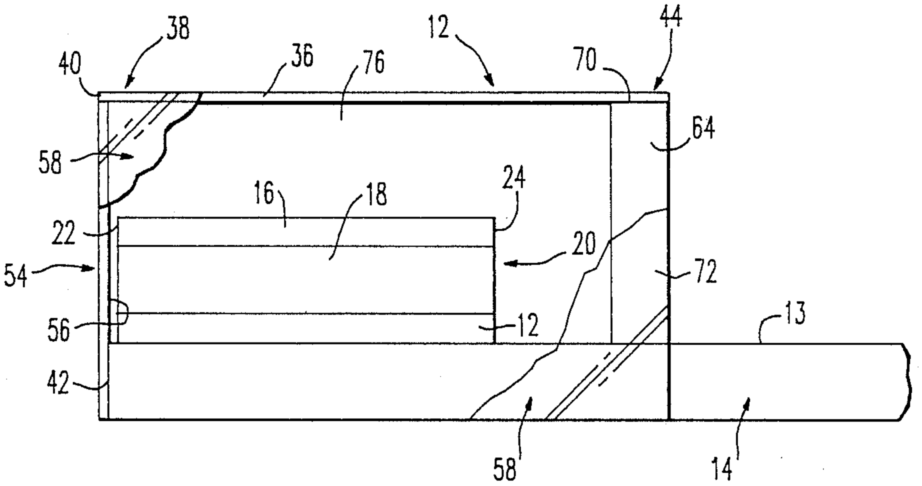
FIG. 2 is a partial sectional view in side elevation of the edge emitter assembly and packaging assembly of FIG. 1.

Now referring to FIGS. 1 and 2, it is seen that the TFEL edge emitter structure 20 disposed on substrate layer 14 is enclosed in a packaging assembly generally designated by the numeral 12. As will be explained herein, packaging assembly 12 surrounds at least a portion of TFEL edge emitter structure 20 to seal the light-emitting pixels of the structure in a contaminant-free environment. As will be further explained, at least the wall portion of packaging assembly 12 adjacent to the array 31 of pixels 32 light-emitting edge surfaces or faces 34 is formed from a preselected translucent material to permit light energy emitted by selected pixels forming the linear array and positioned interior to the packaging assembly to pass through the wall of the packaging assembly.

Packaging assembly 12 illustrated in FIGS. 1 and 2 includes a first member 36 positioned in overlying, spaced relation with TFEL edge emitter structure 20. First member 36 has a front edge portion 38 with a front edge surface 42 thereof substantially aligned with the front edge surface 42 of substrate layer 14. First member 36 further includes a rear edge portion 44 opposite front edge portion 38, and a pair of lateral edge surfaces 46, 48 substantially aligned with substrate layer 16 lateral edge surfaces 50 and 52. As described, first member 36 extends from substantially the front edge surface 42 of substrate layer 14 a preselected distance rearward of the rear end portion 24 of TFEL edge emitter structure 20. In addition, first member 36 extends substantially between the lateral edge surfaces 50, 52 of substrate layer 14.

Packaging assembly 12 further includes a translucent front member 54 which extends between substrate layer 14 front edge surface 42 and the front edge portion 38 of first member 36. Translucent front member 54 has a width sufficient to span the substrate layer 14 lateral edge surfaces 50, 52. As seen in FIG. 2, translucent front member 54 is substantially parallel with the array 31 of pixels 32 light-emitting edge surfaces 34. The light-emitting edge surfaces 34 of the pixels 32 forming TFEL structure 20 are spaced from the inside surface 56 of translucent front member 54, and as will be explained later in greater detail, the void between the pixels light-emitting edge surfaces 34 and translucent front member 54 inside surface 56 may be filled with either an oil having an index of refraction which matches the index of refraction of front member 54 or the index of refraction of electrically energizable composite layer 18; or filled with an inert gas.

Again referring to FIGS. 1 and 2, packaging assembly 12 further includes a pair of side members 58, 60 each respectively extending between the lateral edge surfaces 46, 48 of first member 36, substrate layer 14 lateral edge surfaces 50, 52, and the lateral edge surfaces of translucent front member 54 (only the lateral edge surface 62 of front member 98 shown in FIG. 1). A rear member 64 positioned rearward of TFEL structure 20 rear end portion 24 has a pair of lateral edge portions 66, 68 substantially aligned with the lateral edge surfaces 50, 52 of substrate layer 14. Rear member 64 has an upper surface 70 which supports the rear edge portion 44 of first member 36. Rear member 64 also includes a lower surface 72 which abuts the first or upper surface 74 of substrate layer 14.

As described, first member 36, translucent front member 54, side members 58, 60 and rear member 64 form a packaging assembly designated by the numeral 12 operable to enclose TFEL edge emitter structure 20 within a contaminant-free environment. First member 36, translucent front member 54, side members 58, 60 and rear member 64 are sealingly connected with each other and the first, lateral and front edge surfaces of substrate layer 14 as required to form packaging assembly 12. The sealing connections are formed via a suitable bonding material such as epoxy or glass frit. It is preferred that a glass frit be utilized since a glass frit will permit TFEL edge emitter structure 20 to be hermetically sealed within the hollow interior portion 76 of packaging assembly 12. It is apparent from FIGS. 1 and 2 that TFEL edge emitter structure 20 only fills a portion of the hollow interior portion 76 of packaging assembly 12. The remaining portion of hollow interior 76 may either be vacuum evacuated and purged with an inert gas, or filled with an oil-like material having a desired index of refraction. If an oil-like material is utilized, its index of refraction preferably should closely match either the index of refraction of translucent front member 54 or the index of refraction of electrically energizable composite layer 18. Each of the members 36, 58, 60 and 64 may be made from a translucent glass material, if desired. However, front member 54 must be made from a translucent material to permit the light emitted from each of the pixels 32 forming TFEL edge emitter structure 20 to pass through the translucent front member or wall to the exterior of the packaging assembly. Although rear member 64 is illustrated in FIGS. 1 and 2 as a generally rectangular member, rear member 64 may be formed from a glass or epoxy material if desired.

Figure 3:
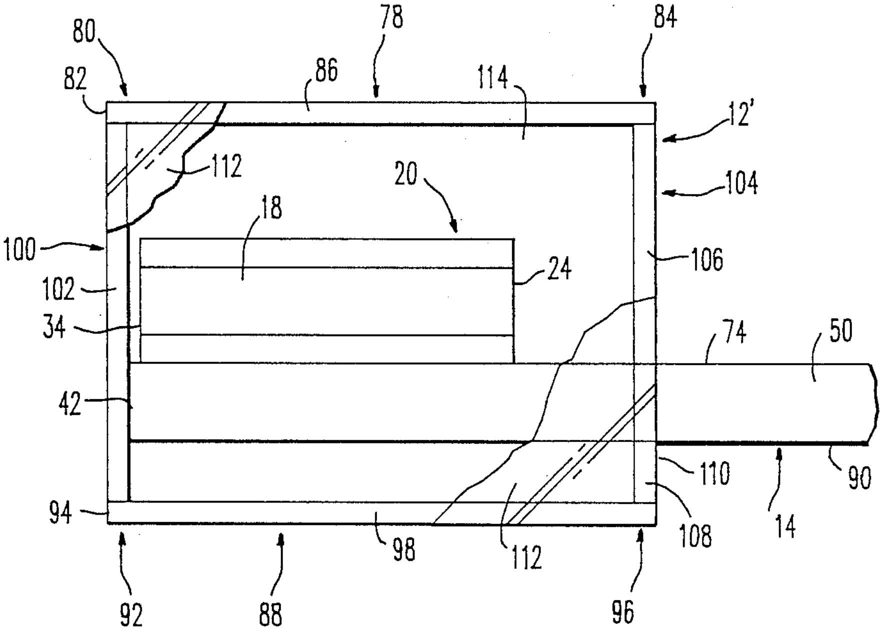
FIG. 3 is a partial sectional view in side elevation of an alternate embodiment packaging assembly for use with a thin film electroluminescent edge emitter assembly.

Now referring to FIG. 3, there is illustrated an alternate embodiment packaging assembly generally designated by the numeral 12' operable to enclose TFEL edge emitter structure 20 in a contaminant-free environment. As seen in FIG. 3, packaging assembly 12' includes a first member 78 positioned in overlying, spaced relation with TFEL edge emitter structure 20 and the first or upper surface 74 of substrate layer 14. First member 78 has a front edge portion 80 with a front edge surface 82 thereof substantially aligned with the front edge surface 42 of substrate layer 14. First member 78 further includes a rear edge portion 84 opposite front edge portion 80, and a pair of opposing lateral edge surfaces each substantially aligned with the lateral edge surfaces of substrate layer 14 (only first member 78 lateral edge surface 86 and substrate layer 14 lateral edge surface 50 illustrated in FIG. 3).

Packaging assembly 12' further includes a second member 88 positioned in spaced relation with substrate layer 14 bottom or second surface 90. As seen in FIG. 3, second member 88 is substantially in registry with first member 78, and has a front edge portion 92 with a front edge surface 94 thereof substantially aligned with the front edge surfaces 82 and 42 of first member 78 and substrate layer 14, respectively. Second member 88 further includes a rear edge portion 96 opposite front edge portion 92 and a pair of opposing lateral edge surfaces each substantially aligned with one of the first member lateral edge surfaces and one of the substrate layer lateral edge surfaces (only lateral edge surface 98 illustrated in FIG. 3).

A translucent front member 100 extends between the front edge portions 80, 92 of first and second members 78, 88. Front member 100 has a width to extend between the lateral edge surfaces of substrate layer 14 and includes a pair of opposing lateral edge surfaces (only lateral edge surface 102 illustrated in FIG. 3). A rear first member 104 is positioned rearward of TFEL edge emitter structure 20 rear end portion 24 and extends between the first or upper surface 74 of substrate layer 14 and the rear edge portion 84 of first member 78. Rear first member 104 includes a pair of opposing lateral edge surfaces (only lateral edge surface 106 illustrated in FIG. 3) each substantially aligned with one of the substrate layer 14 lateral edge surfaces. A rear second member 108 depends from the second or bottom surface 90 of substrate layer 14 and extends between second surface 90 and second member 88 rear edge portion 96. The rear second member also has a pair of opposing lateral edge surfaces (only lateral edge surface 110 illustrated in FIG. 3) substantially aligned with one of the substrate layer 14 lateral edge surfaces. A pair of side members (only side member 112 illustrated in FIG. 3) extend between the first and second members lateral edge surfaces, the front member lateral edge surfaces and the rear first and second members lateral edge surfaces. The first member, second member, translucent front member, rear first and second members and pair of side members are sealingly connected with each other as required to form packaging assembly 12'. The sealing connections are made via a suitable sealing material such as an epoxy or glass frit. It is preferred that a glass frit be utilized since a glass frit will permit TFEL structure 20 to be hermetically sealed within the packaging assembly. In addition, although not illustrated in FIG. 3, the rear first and second members 104, 108 may be formed from a glass frit or epoxy material if desired. As seen in FIG. 3, packaging assembly 12' forms a generally rectangular box-like structure having a hollow interior portion 114. TFEL edge emitter structure 20 is positioned within a portion of hollow interior portion 114 with the light-emitting edge surfaces of each of the pixels 32 positioned adjacent to translucent front member 100. The remaining portion of hollow interior 114 may either be vacuum evacuated and purged with an inert gas, or filled with an oil-like material having a desired index of refraction. Preferably, the index of refraction of the oil-like material should closely match either the index of refraction of translucent front member 100 or the index of refraction of electrically energizable composite layer 18.

Figure 4:
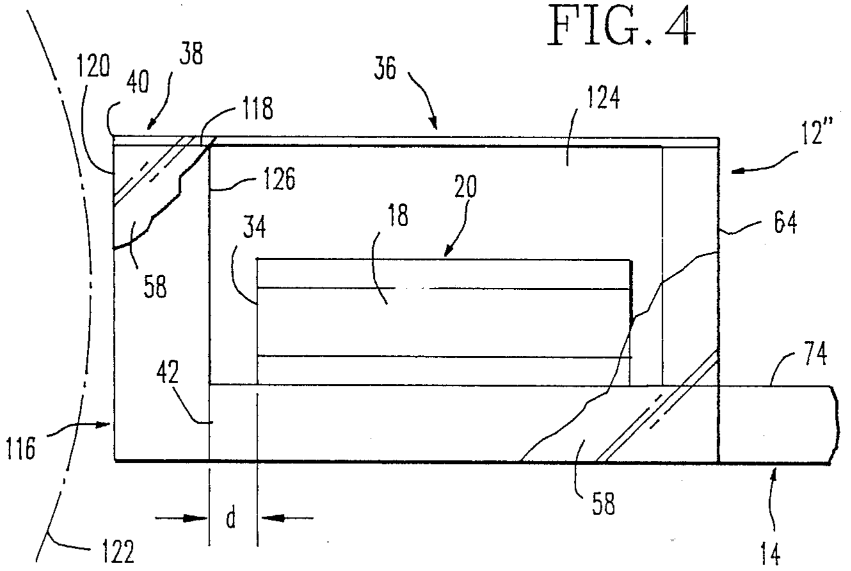
FIG. 4 is a partial sectional view in side elevation of another alternate embodiment packaging assembly for use with a thin film electroluminescent edge emitter assembly.

Now referring to FIG. 4, there is illustrated another alternate embodiment packaging assembly generally designated by the numeral 12". As with the packaging assemblies 12 and 12' previously described, packaging assembly 12" completely encloses TFEL edge emitter structure 20 in a contaminant-free environment. As seen in FIG. 4, TFEL edge emitter structure 20 is positioned on the first or upper surface 74 of substrate layer 14 so that the light-emitting edge surfaces 34 of the array of pixels of TFEL structure 20 are spaced a preselected distance d from the front edge surface 42 of the substrate layer. Packaging assembly 12" includes the first member 36, side members 58, 60 (only side member 58 illustrated in FIG. 4) and rear member 64 previously described with reference to FIGS. 1 and 2. Packaging assembly 12" further includes a translucent front member 116 in the form of an optical lens positioned in abutting contact with the substrate layer 14 front edge surface 42. Translucent front member 116 has a width to span the width of the substrate layer front edge surface defined herein as the distance between substrate layer 14 opposing lateral edge surfaces 50, 52 (as illustrated in FIG. 1). Translucent front member 116 is positioned so that its first surface 118 is in underlying, supporting relation with first member 36 front edge portion 38 and its front edge surface 120 is substantially aligned with first member 36 front edge surface 40.

Edge-emitter enclosing packaging assembly 12" including optical lens 116 is utilized in applications where the operating environment in which the edge emitter structure is utilized requires a preselected distance to be maintained between the edge emitter structure and the surface upon which light beams emitted by the structure are to be projected. For example, if member 122 schematically represents a photoreceptor coating on a rotatable drum utilized in electrophotographic-type imaging stations, it is known that over a period of time toner particles will accumulate on the drum as a result of normal operation of the imaging station. If toner particles are likely to accumulate on the photoreceptor surface, then utilizing TFEL edge emitter assembly 10 including structure 20 as the imaging station light source and positioning the light-emitting edge surfaces 34 of the pixels forming the edge emitter structure too close to the photoreceptor surface will result in some of the accumulated toner particles adhering to the pixels' light-emitting edge surfaces. This will prevent the affected pixels from properly projecting light energy when required. In order to prevent this, the edge emitter structure itself must be sufficiently spaced from the photoreceptor surface to prevent accumulated toner particles from adhering to the pixels' light-emitting surfaces. However, by moving the TFEL edge emitter assembly away from the photoreceptor surface, light energy beam spread will occur, resulting in a diminution of the resolution of the edge emitter array.

By forming the packaging assembly 12" translucent front member 116 from an optical, self-focusing lens, however, the TFEL edge emitter structure may be positioned a desired distance from the surface of member 122 since the beams of light energy projected by the individual pixels of the assembly will be passed through the optical lens. The optical lens will focus the beams of light energy projected by the edge emitter assembly to correct for beam spread and provide essentially focused beams of light energy to the surface of member 122. The use of a self-focusing, optical lens as a portion of a packaging assembly for TFEL edge emitter structure 20 will be more fully described herein with reference to FIG. 6. As with the packaging assemblies 12 and 12', packaging assembly 12" is a generally rectangular box-like structure having a hollow interior portion 124. TFEL edge emitter structure 20 is positioned within a portion of hollow interior portion 124 with the light-emitting edge surfaces of the array of pixels positioned a preselected distance d from translucent front member 116 rear or inside edge surface 126. The remaining portion of hollow interior 124 may either be vacuum evacuated and purged with an inert gas, or filled with an oil-like material having an index of refraction substantially matching either the index of refraction of the self-focusing lens or the index of refraction of composite layer 18.

Figure 5:
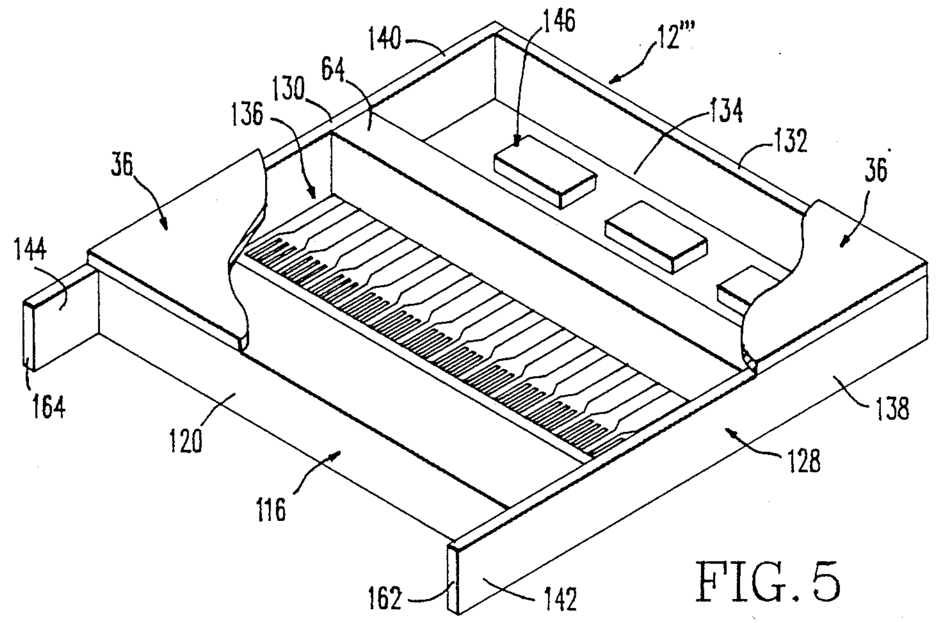
FIG. 5 is a partial sectional, perspective view of the thin film electroluminescent edge emitter assembly of FIG. 4 housed in a frame-like package to permit the edge emitter assembly to be used as a component of an electrophotographic-type imaging station.

Now referring to FIG. 5, there is illustrated another alternate embodiment packaging assembly generally designated by the numeral 12''' for enclosing schematically represented TFEL edge emitter structure 20 in a contaminant-free environment. Packaging assembly 12''' includes the rear member 64, translucent front member 116 in the form of an optical lens and first member 36 extending between translucent front member 116 and rear member 64 previously described with respect to FIG. 4. Although only schematically illustrated in FIG. 5, it should be understood that TFEL edge emitter structure 20 is disposed on the upper surface 74 of substrate layer 14 as illustrated in FIG. 4 so that the light-emitting edge surfaces 34 of the pixels 32 of the structure are spaced a preselected distance d from the front edge surface 42 of substrate layer 14.

Packaging assembly 12''' includes a pair of first and second lateral members 128, 130 positioned in abutting contact with the lateral edge surfaces 50, 52 of substrate layer 14 (lateral edge surfaces 50, 52 illustrated in FIG. 1). A spanning member 132 is positioned in abutting contact with the rear edge surface 134 of substrate layer 14 and extends between the first and second lateral members 128, 130. As seen in FIG. 5, the first and second lateral members 128, 130, front translucent member 116 and spanning member 132 form a frame-like enclosure for receiving TFEL edge-emitter structure 20 and substrate layer 14. First member 36 extends between first and second lateral members 128, 130, translucent front member 116 and spanning member 132 to enclose TFEL edge emitter structure 20 within the interior 136 of the packaging assembly. Each of the first and second lateral members 128, 130, respectively, includes first portions 138, 140 extending from the rear edge surface 134 of substrate layer 14 to the front edge surface 120 of translucent front member 116, and second portions 142, 144 extending forward of the translucent front member front edge surface 120. The pair of second portions 142, 144 form tab members which, as will be described later in greater detail, may be utilized to maintain a preselected distance between the light-emitting edge surfaces of each of the pixels 32 of TFEL edge emitter structure 20 and a surface upon which light beams emitted by the pixels are to be projected. As seen in FIG. 5, first member 36 is of sufficient size to extend between first and second lateral members 128, 130, front translucent member 116, and spanning member 132 to completely enclose not only TFEL edge emitter structure 20 but also the TFEL edge emitter structure 20 electronic drive system generally designated by the numeral 146 in a contaminant-free environment. The construction and operation of electronic drive system 146 are beyond the scope of this invention, and as such will not be described herein.

Figure 6:
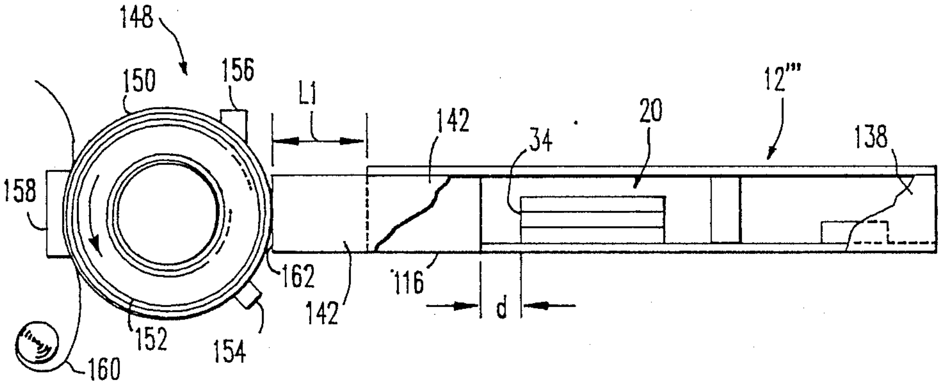
FIG. 6 is a partial sectional view in side elevation of the thin film electroluminescent edge emitter assembly and integral packaging assembly of FIG. 5 utilized as a component of an electrophotographic-type imaging station.

Now referring to FIG. 6, there is illustrated TFEL edge emitter structure 20 and packaging assembly 12''' previously described with respect to FIG. 5. As seen in FIG. 6, the edge emitter structure 20 and packaging assembly 12''' are utilized as a component of an electrophotographic-type imaging station or printer generally designated by the numeral 148. Electrophotographic-type imaging station 148 includes a photoreceptor 150 coated on a rotating drum 152, a charging device 154, the TFEL edge emitter structure 20 enclosed in packaging assembly 12''', a developing device 156, and a transfer device 158. With the exception of the edge emitter structure and integral packaging described herein, the remainder of the components forming imaging station 148 are themselves well known in the art. Electrophotographic imaging station 148 is operable to allow patterned images such as on documents to be printed on a sheet of recording paper 160. For the sake of clarity, accessories such as a fixing device, a cleaning device, a paper feed device and the support mechanisms conventionally used for these accessories have been eliminated from FIG. 6.

Generally, the operation of electrophotographic-type imaging station 148 is as follows. A layer of photoconductive material is formed on the surface of photoreceptor 150 which is caused to rotate at a constant speed on drum 152 in the direction indicated in the arrow. As the photoreceptor 150 passes in proximity to charging device 154, it is uniformly electrified with electrostatic charges which build up on the photoreceptor surface in an axial direction as a result of corona discharge. The uniformly charged surface of the photoreceptor 150 is illuminated via beams of light energy projected by selected pixels of the array formed in TFEL structure 20. The charge on the photoreceptor surface is lost when it is exposed to light, and, as known in the art, the degree of charge lost depends upon the amount of exposure. A charge pattern is formed according to the density of the residual charges on the photoreceptor. After the formation of the density pattern of residual charges via the operation of TFEL edge emitter structure 20, photoreceptor 150 passes adjacent to developing device 156 and a density pattern is formed according to the amount of toner which is attracted by the residual charges held on the photoreceptor surface.

If an edge emitter assembly such as TFEL edge emitter assembly 10 and including structure 20 is utilized as the imaging station light source, the structure 20 should be enclosed in a packaging assembly such as packaging assembly 12''' in order to ensure that the light emitting edge surfaces 34 of the pixels 32 of TFEL edge emitter structure 20 are spaced a preselected distance from the surface of photoreceptor 150. As seen in FIGS. 5 and 6, by varying the lengths L1 of the pair of first and second lateral members 138, 140 tab portions 142, 144, the overall distance or spacing between the surface of the photoreceptor 150 and TFEL edge emitter structure 20 may be varied. The reason for spacing the light-emitting edge surfaces 34 of the array of pixels 32 from the surface of photoreceptor 150 is to prevent toner particles accumulated on the surface of the photoreceptor from adhering to the pixels light-emitting edge surfaces and thereby effectively blocking the emission of light from the affected pixels. However, as previously described, the farther the light-emitting edge surfaces of the pixels forming TFEL edge emitter structure 20 are spaced from the surface of the photoreceptor, the greater the dispersion of the light beams emitted by the pixels. The undesirable dispersion is prevented via the use of translucent front member 116 in the form of a self-focusing lens disposed between the surface of the photoreceptor and the TFEL edge emitter structure. As previously described, optical lens 116 is operable to focus the light energy passed therethrough so that the light energy striking the surface of the photoreceptor has a focused, preselected beam pattern. It should be understood that the light-emitting edge surfaces of the pixels forming TFEL edge emitter structure 20 must be aligned with the center of self-focusing lens 116. In addition, the distance d between the light-emitting edge surfaces 34 of the pixels 32 forming TFEL edge emitter structure 20 and the self-focusing lens, and the distance L1 between the self-focusing lens and the surface of the photoreceptor must each be adjusted properly for desired light focusing. Adjusting the distance between self-focusing lens 116 and the surface of the photoreceptor is, as previously described, accomplished by adjusting the lengths L1 of each of the tab portions 142, 144 of packaging assembly 12'''. Since the end portions 162, 164 of the tab portions 142, 144 are closely adjacent to the surface of the photoreceptor, varying the lengths L1 of the tab portions allows precise positioning of the self-focusing lens relative to the photoreceptor surface.

Figures 7, 8:
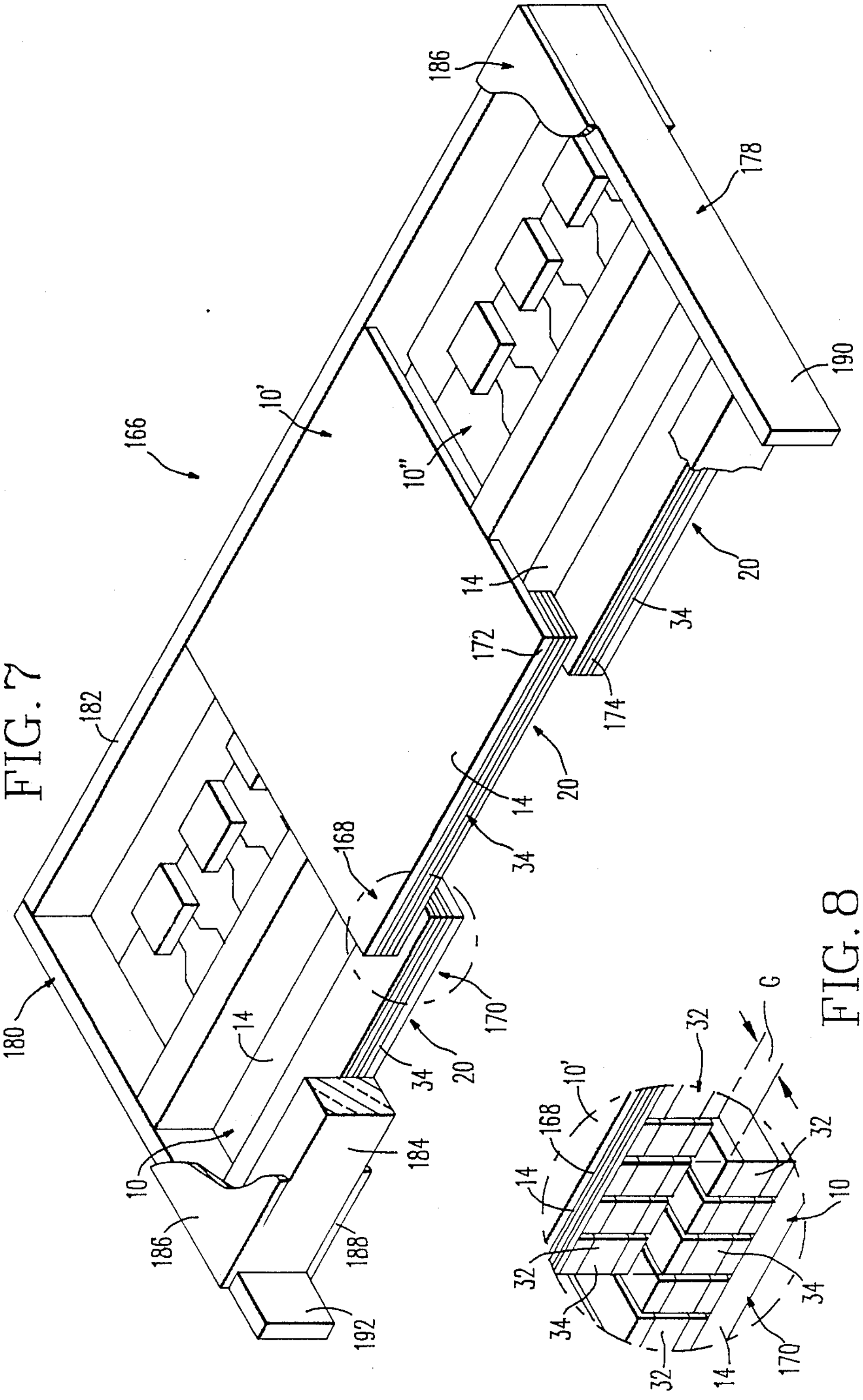
FIG. 7 is a partial sectional, perspective view of a plurality of individual edge emitter assemblies maintained in fixed relation relative to each other by means of an enclosing frame-like structure operable to house the assemblies in a contaminant-free environment.
FIG. 8 is an enlarged view of a portion of FIG. 7 illustrating the overlap between adjacent edge emitter assemblies end portions within the frame-like structure.

Now referring to FIGS. 7 and 8, there is illustrated a packaging assembly operable to both enclose a plurality of individual TFEL edge emitter assemblies each including an edge emitter structure in a contaminant-free environment and provide a frame for aligning the individual TFEL edge emitter structures to form a composite edge emitter array of light-emitting pixels of desired overall length.

As seen in FIG. 7, composite edge emitter array 166 includes three individual TFEL edge emitter assemblies 10, 10', 10" each including an edge emitter structure 20 disposed on a layer of substrate material 14. For clarity, the edge emitter structures are each shown schematically in FIG. 7. However, it should be understood that each of the TFEL edge emitter structures 20 are identical to the TFEL edge emitter structure described with reference to FIG. 1.

The first, second and third edge emitter assemblies 10, 10', 10" are oriented relative to each other so that TFEL edge emitter assembly 10' is positioned between edge emitter assemblies 10 and 10" and inverted relative thereto. In addition, the plurality of TFEL edge emitter assemblies 10, 10', 10" are oriented relative to each other so that the light-emitting edge surfaces 34 of the pixels 32 of the inverted TFEL edge emitter assembly 10' lie in substantially the same plane as the light-emitting edge surfaces 34 of the pixels 32 of the TFEL edge emitter assembles 10 and 10". Portions of the inverted TFEL edge emitter assembly 10' overlap portions of TFEL edge emitter assemblies 10, 10" to provide a composite, continuous array of light-emitting pixels formed from the light-emitting pixels of the TFEL edge emitter assemblies 10, 10' and 10". This overlapping feature is illustrated in further detail in FIG. 8.

As seen in FIG. 8, three pixels 32 of TFEL edge emitter assembly 10 are aligned with three pixels 32 of inverted TFEL edge emitter assembly 10' at their respective adjacent assembly end portions 168, 170. Since three of the pixels 32 of TFEL edge emitter assembly 10 overlap three of the pixels 32 of inverted TFEL edge emitter assembly 10', and the gap G between aligned pixels is typically less than 10 microns, the pixels 32 of TFEL edge emitter assembly 10 and the pixels 32 of inverted TFEL edge emitter assembly 10' form a substantially linear, composite array of pixels. Although not specifically illustrated in FIGS. 7 and 8, it should be understood that TFEL edge emitter assemblies 10' and 10" also overlap at their respective adjacent assembly end portions 172, 174 in the manner illustrated in FIG. 8. By overlapping a preselected number of pixels at the adjacent end portions of TFEL edge emitter assemblies 10, 10' and the adjacent end portions of TFEL edge emitter assemblies 10', 10" a composite array of light-emitting pixels is provided which is substantially linear.

Again referring to FIG. 7, the TFEL edge emitter assemblies 10, 10' and 10" are positioned within a frame-like packaging assembly 176 which encloses the assemblies 10, 10' and 10" in a contaminant-free environment. The packaging assembly 176 includes a pair of lateral members 178, 180, a spanning member 182 and a translucent front member 184 in the form of an optical, self-focusing lens. Front member 184 may be common to each of the assemblies 10, 10', 10" if desired. First and second members 186, 188 extend between spanning member 182, translucent front member 184, and the lateral members 178, 180 to completely enclose the TFEL edge emitter assemblies 10, 10' and 10" in a contaminant-free environment. As with the packaging assemblies previously described herein, the lateral members 178, 180, rear member 182, translucent front member 184 and first and second members 186, 188 are sealingly connected with each other as required via a suitable epoxy material or glass frit.

By enclosing a plurality of individual TFEL edge emitter assemblies in a frame-like packaging assembly such as packaging assembly 176 and properly orienting the edge emitter assemblies relative to each other, the plurality of edge emitter assemblies may be combined to form a thin film electroluminescent high resolution light source for use with wide-track printers or electrophotographic-type imaging stations. By varying the number of TFEL edge emitter assemblies combined within the packaging assembly, a composite array of light-emitting pixels of desired overall length may be formed. As with the packaging assembly 12'" described with reference to FIG. 5, packaging assembly 176 may also include a pair of extending tab portions 190, 192 operable to position the light-emitting edge surfaces or faces of the pixels of the composite array a preselected distance from the surface of a photoreceptor forming a portion of an electrophotographic-type imaging station.

Although the present invention has been described in terms of what are at present believed to be its preferred embodiments, it will be apparent to those skilled in the art that various changes may be made without departing from the scope of the invention. It is therefore intended that the appended claims cover such changes.

We claim:

1. A thin film electroluminescent edge emitter assembly and integral packaging, comprising:

a thin film electroluminescent edge emitter assembly formed from a thin film edge emitter structure disposed on a layer of substrate material, said structure having a configuration to define a linear array of spaced apart, light-emitting pixels, said substrate layer including a front edge portion and a pair of opposing lateral edge portions;

each said pixel including a first surface disposed on said substrate layer, a second surface opposite said first surface, and a light-emitting edge surface extending between said first and second surfaces and disposed at a location adjacent to said front edge portion of said substrate layer; and packaging means surrounding at least a portion of said edge emitter structure and operable to enclose said linear array of light-emitting pixels in a contaminant-free environment, said packaging means including a first member positioned in overlying, spaced relation with said edge emitter structure and having a front edge portion substantially aligned with said front edge portion of said substrate layer, a rear edge portion opposite said front edge portion and a pair of lateral edge portions each substantially aligned with one of said substrate layer lateral edge portions, a front member extending between and sealingly secured to said first member front edge portion and said substrate layer front edge portion, said front member having a pair of opposing lateral edge portions and being disposed adjacent to said light-emitting edge surfaces of said pixels of said array, said front member being made from a preselected translucent material to permit light energy emitted by selected ones of said pixels of said array interior to said packaging means to pass through said translucent front member, a pair of side members extending between and sealingly secured to said first member lateral edge portions, said substrate layer lateral edge portions and said front member lateral edge portions, and a rear member disposed on said substrate layer and positioned rearward of said edge emitter structure, said rear member extending between and sealingly secured to said first member rear edge portion, said substrate layer and said pair of side members.

2. The thin film electroluminescent edge emitter assembly and integral packaging of claim 1, wherein:

said packaging means is made from a glass material.

3. The thin film electroluminescent edge emitter assembly and integral packaging of claim 1, wherein:

said preselected sealing material is epoxy.

4. The thin film electroluminescent edge emitter assembly and integral packaging of claim 1, wherein:

said preselected sealing material is a glass frit.

5. A thin film electroluminescent edge emitter assembly and integral packaging, comprising:

a thin film electroluminescent edge emitter assembly formed from a thin film edge emitter structure disposed on a layer of substrate material, said structure having a configuration to define a linear array of spaced apart, light-emitting pixels;

each said pixel including a first surface disposed on said substrate layer, a second surface opposite said first surface and a light-emitting edge surface extending between said first and second surfaces; and packaging means surrounding at least a portion of said edge emitter structure and operable to enclose said linear array of light-emitting pixels in a contaminant-free environment, at least a portion of said packaging means including a wall of said packaging means adjacent to said light-emitting edge surfaces of said pixels forming said array being made from a preselected translucent material to permit light energy emitted by selected ones of said pixels of said array interior to said packaging means to pass through said wall of said packaging means;

said packaging means having a hollow interior portion, said edge emitter structure being positioned within a portion of said packaging means hollow interior portion, and the remaining portion of said packaging means hollow interior portion being filled with an oil-like material having an index of refraction substantially identical to the index of refraction of said packaging means translucent wall.

6. A thin film electroluminescent edge emitter assembly and integral packaging, comprising:

a thin film electroluminescent edge emitter assembly formed from a thin film edge emitter structure disposed on a layer of substrate material, said structure having a configuration to define a linear array of spaced apart, light-emitting pixels, said substrate layer including a first surface upon which said edge emitter structure is disposed, an opposing second surface, a front edge portion extending between said first and second surfaces and a pair of opposing lateral edge portions extending from said front edge portion and between said first and second surfaces;

each said pixel including a first surface disposed on said substrate layer first surface, a second surface opposite said first surface, and a light-emitting edge surface extending between said first and second surfaces and disposed at a location adjacent to said front edge portion of said substrate layer; and packaging means surrounding at least a portion of said edge emitter structure and operable to enclose said linear array of light-emitting pixels in a contaminant-free environment, said packaging means including a first member positioned in overlying, spaced relation with said edge emitter structure and said substrate layer first surface, said first member having a front edge portion substantially aligned with said front edge portion of said substrate layer, a rear edge portion opposite said front edge portion and a pair of lateral edge portions each substantially aligned with one of said substrate layer lateral edge portions, a second member positioned in spaced relation with said substrate layer second surface and substantially in registry with said first member, said second member having a front edge portion substantially aligned with said front edge portion of said first member and said substrate layer, a rear edge portion opposite said front edge portion and a pair of lateral edge portions each substantially aligned with one of said first member lateral edge portions and one of said substrate layer lateral edge portions;

a front member extending between and sealingly secured to said first and second members front edge portions, said front member having a pair of opposing lateral edge portions and being disposed adjacent to said light-emitting edge surfaces of said pixels of said array, said front member being made from a preselected translucent material to permit light energy emitted by selected ones of said pixels of said array interior to said packaging means to pass through said translucent front member, a rear first member disposed on said first surface of said substrate layer and positioned rearward of said edge emitter structure, said rear first member extending between and sealingly secured to said first member rear edge portion and said substrate layer first surface, and rear first member having a pair of opposing lateral edge portions each substantially aligned with one of said substrate layer lateral edge portions;

a rear second member depending from said second surface of said substrate layer and extending between and sealingly secured to said second member rear edge portion and said substrate layer second surface, said rear second member having a pair of opposing lateral edge portions each substantially aligned with one of said substrate layer lateral edge portions, and a pair of side members extending between and sealingly secured to said first and second members lateral edge portions, said front member lateral edge portions and said rear first and second members lateral edge portions.

7. The thin film electroluminescent edge emitter assembly and integral packaging of claim 6, further comprising:

a preselected sealing material sealably securing said respective edge portions of said substrate layer and of said front member, said first and second members and said rear member of said packaging means.

8. The thin film electroluminescent edge emitter assembly and integral packaging of claim 7, wherein:

said preselected sealing material is one of a glass frit and an epoxy.

9. The thin film electroluminescent edge emitter assembly and integral packaging of claim 6, wherein:

said first and second members, said translucent front member, said pair of side members and said first and second rear members are arranged to form, upon assembly, a generally rectangular box-like structure having a hollow interior portion;

at least a portion of said edge emitter structure is positioned within a portion of said hollow interior portion with the light-emitting edge surface of each said pixel of said linear array positioned adjacent to said translucent front member; and the remaining portion of said hollow interior portion is filled with an oil-like material having an index of refraction substantially identical to the index of refraction of said translucent front member.

10. A thin film electroluminescent edge emitter assembly and integral packaging, comprising:

a thin film electroluminescent edge emitter assembly formed from a thin film edge emitter structure disposed on a layer of substrate material, said structure having a configuration to define a linear array of spaced apart, light-emitting pixels, said substrate layer including a first surface upon which said edge emitter structure is disposed, an opposing second surface, a front edge portion extending between said first and second surfaces and a pair of opposing lateral edge portions extending from said front edge portion and between said first and second surfaces, the distance between said pair of opposing substrate layer lateral edge portions defining a width of said front edge portion;

each said pixel including a first surface disposed on said substrate layer first surface, a second surface opposite said first surface, and a light-emitting edge surface extending between said first and second surfaces and disposed at a location adjacent to said front edge portion of said substrate layer, said light-emitting surfaces of said pixels spaced substantially the same preselected distance from said substrate layer front edge portion; and packaging means surrounding at least a portion of said edge emitter structure and operable to enclose said linear array of light-emitting pixels in a contaminant-free environment, said packaging means including a first member positioned in overlying, spaced relation with said edge emitter structure and said substrate layer first surface, said first member having a front edge portion, an opposing rear edge portion and a pair of lateral edge portions each substantially aligned with one of said substrate layer lateral edge portions, a front member positioned in abutting contact with said substrate layer front edge portion and spanning said preselected width thereof, said front member being positioned with a first surface thereof in underlying, supporting relation with said first member front edge portion and a front edge surface of said front member substantially aligned with said first member front edge portion, said front member being disposed adjacent to said light-emitting edge surfaces of said pixels of said array and being in the form of an optical lens made from a preselected translucent material to permit light energy emitted by selected ones of said pixels of said array interior to said packaging means to pass through said translucent front member, a rear member disposed on said first surface of said substrate layer and positioned rearward of said edge emitter structure, and rear member extending between and sealingly secured to said first member rear edge portion and said first surface of said substrate layer, and a pair of side members extending between and sealingly secured to said first member lateral edge portions and said substrate layer lateral edge portions, said pair of side members further extending between and sealingly secured to said front and rear members.

11. The thin film electroluminescent edge emitter assembly and integral packaging of claim 10, further comprising:

a preselected sealing material sealably securing said respective edge portions of said substrate layer and of said front member, said first and second members and said rear member of said packaging means.

12. The thin film electroluminescent edge emitter assembly and integral packaging of claim 11, wherein:

said preselected sealing material is one of a glass frit and an epoxy.

13. The thin film electroluminescent edge emitter assembly and integral packaging of claim 10, wherein:

said first member, said optical lens, said pair of side members and said rear member are arranged to form, upon assembly, a generally rectangular box-like structure having a hollow interior portion;

at least a portion of said edge emitter structure is positioned within a portion of said hollow interior portion with the light-emitting edge surface of each said pixel of said linear array positioned a preselected distance from said optical lens; and the remaining portion of said hollow interior portion is filled with an oil-like material having an index of refraction substantially identical to the index of refraction of said optical lens.

14. The thin film electroluminescent edge emitter assembly with integral packaging of claim 10, wherein;

said front translucent member is an optical lens.

15. A thin film electroluminescent edge emitter assembly and integral packaging, comprising:

a thin film electroluminescent edge emitter assembly formed from a thin film edge emitter structure disposed on a layer of substrate material, said structure having a configuration to define a linear array of spaced apart, light-emitting pixels, said substrate layer including a pair of generally rectangular, spaced-apart first and second surfaces each having a front edge portion, a rear edge portion and a pair of lateral edge portions extending therebetween, a front edge surface extending between said first and second surfaces at said first and second surfaces front edge portions, a rear edge surface extending between said first and second surfaces at said first and second surfaces rear edge portions, and a pair of lateral edge surfaces each extending between said first and second surfaces at said first and second surfaces lateral edge portions;

each said pixel including a first surface disposed on said substrate layer first surface at a location adjacent to said first surface front edge portion, a second surface opposite said first surface, and a light-emitting edge surface extending between said first and second surfaces and disposed at a location adjacent to said front edge surface of said substrate layer, said light-emitting edge surfaces of said pixels being spaced substantially the same preselected distance from said substrate layer front edge surface; and packaging means surrounding at least a portion of said edge emitter structure and operable to enclose said linear array of light-emitting pixels in a contaminant-free environment, said packaging means including a translucent front member having a front edge surface and an opposing rear edge surface and being positioned with its rear edge surface in abutting contact with said substrate layer front edge surface and having a width to extend between said substrate layer lateral edge surfaces, said front member being disposed adjacent to said light-emitting edge surfaces of said pixels of said array and made from a preselected translucent material to permit light energy emitted by selected ones of said pixels of said array interior to said packaging means to pass through said translucent front member, a first lateral member positioned in abutting contact with one of said substrate layer lateral edge surfaces, a portion of said first lateral member extending from said substrate layer rear edge surface to said translucent front member front edge surface and the remaining portion of said first lateral member extending forwardly of said front member front edge surface to form a first extending tab portion of preselected length, a second lateral member positioned in abutting contact with the other of said substrate layer lateral edge surfaces, a portion of said second lateral member extending from said substrate layer rear edge surface to said translucent front member front edge surface and the remaining portion of said second lateral member extending forward of said front member front edge surface to form a second extending tab portion of preselected length, a rear member positioned in abutting contact with said substrate layer rear edge surface and extending between said first and second lateral members, and a cover member extending between and supported by said first and second lateral members, said front translucent member and said rear member, said first and second lateral members, front translucent member, rear member and cover member forming said packaging means and providing a frame-like, moisture-proof enclosure for receiving said edge emitter assembly, said light-emitting edge surfaces of said linear array of pixels within said frame-like enclosure being arranged to be positioned a preselected distance from a photoreceptor which forms a portion of an electrophotographic-type imaging assembly, said preselected distance being determined by said preselected lengths of said first and second extending tab portions.

16. An electrophotographic-imaging station, comprising:

a photoreceptor having a surface;

a charging device positioned adjacent to said photoreceptor surface for charging an area of said photoreceptor surface;

a developing device positioned adjacent to said photoreceptor surface for forming a toner density pattern on said charged area of said photoreceptor surface;

a transfer device positioned adjacent to said photoreceptor surface for transferring said toner density pattern from said charged area of said photoreceptor surface to a sheet of paper;

a thin film electroluminescent edge emitter assembly spaced a preselected distance from said photoreceptor surface, said edge emitter assembly including an edge emitter structure disposed on a layer of substrate material and having a configuration to define a linear array of spaced-apart, light-emitting pixels at a front edge portion of said structure, said substrate layer including a front edge portion and a pair of opposing lateral edge portions;

each said pixel including a first surface disposed on said substrate layer, a second surface spaced from said first surface and a light-emitting edge surface extending between said first and second surfaces and disposed at a location adjacent to said front edge portion of said substrate layer; and packaging means surrounding at least a portion of said edge emitter structure and operable to enclose said linear array of light-emitting pixels in a contaminant-free environment, said packaging means including a first member positioned in overlying, spaced relation with said edge emitter structure and having a front edge portion substantially aligned with said front edge portion of said substrate layer, a rear edge portion opposite said front edge portion and a pair of lateral edge portions each substantially aligned with one of said substrate layer lateral edge portion, a front member extending between and sealingly secured to said first member front edge portion and said substrate layer front edge portion, said front member having a pair of opposing lateral edge portions and being disposed adjacent to said light-emitting edge surfaces of said pixels of said array, said front member being made from a preselected translucent material to permit light energy emitted by selected ones of said pixels of said array interior to said packaging means to pass through said translucent front member and into striking contact with said photoreceptor surface, a pair of side members extending between and sealingly secured to said first member lateral edge portion, said substrate layer lateral edge portions and said front member lateral edge portions, and a rear member disposed on said layer of substrate material and positioned rearward of said edge emitter structure, said rear member extending between and sealingly secured to said first member rear edge portion, said substrate layer and said pair of side members.

17. The electrophotographic-imaging station of claim 16, wherein:

said packaging means includes at least a pair of tab portions of preselected length extending forward of said packaging means translucent front member; and said tab portions are positioned adjacent to said photoreceptor surface and operable to space the light-emitting edge surfaces of said pixels said preselected distance from said photoreceptor surface.

18. A thin film electroluminescent, composite light source, comprising:

first and second edge emitter assemblies;

said first and second emitter assemblies each including a thin film electroluminescent edge emitter structure disposed on a layer of substrate material, each structure having a configuration to define a linear array of spaced-apart, light-emitting pixels;

each said pixel of each said structure including a first surface disposed on the layer of substrate material associated therewith, a second surface spaced from said first surface and a light-emitting edge surface extending between said first and second surfaces;

said first and second edge emitter assemblies being oriented relative to each other so that said second edge emitter assembly is positioned adjacent to said first assembly and inverted relative thereto with the light-emitting edge surfaces of said pixels of said inverted second assembly lying in substantially the same plane as the light-emitting edge surfaces of said pixels of said first assembly; and adjacent end portions of said first assembly and said inverted, second assembly overlapping each other to provide that the light-emitting pixels of said first and second assemblies form a composite array of light-emitting pixels of desired overall length.

19. The thin film electroluminescent, composite light source of claim 18, wherein:

said second edge emitter assembly is inverted relative to said first edge emitter assembly so that a preselected number of light-emitting pixels of said second assembly overlap and are substantially aligned with the same preselected number of light-emitting pixels of said first assembly.

20. The thin film electroluminescent, composite light source of claim 18, which includes:

packaging means surrounding said first and second edge emitter assemblies to enclose said first and second assemblies in a contaminant-free environment, at least a portion of said packaging means including a wall of said packaging means adjacent to said light-emitting edge surfaces of said pixels forming said composite array being made from a preselected translucent material to permit light energy emitted by selected pixels of said composite array and interior to said packaging means to pass through said translucent wall.

21. The thin film electroluminescent, composite light source of claim 20, wherein:

said packaging means forms a generally rectangular, box-like structure for receiving said first and second edge emitter assemblies;

said translucent wall is formed from an optical lens; and said light-emitting edge surfaces of said pixels forming said composite array are positioned adjacent to said optical lens, said optical lens being operable to focus light beams emitted by selected ones of said pixels and passed therethrough into a beam of light energy having a preselected beam pattern.

* * * * *